United States Patent [19]

Lutz et al.

[11] Patent Number: 4,880,908

[45] Date of Patent: Nov. 14, 1989

[54] POLYMER BLEND OF CARBON MONOXIDE/OLEFIN COPOLYMER AND POLYCARBONATE

[75] Inventors: Robert G. Lutz, Santa Rosa, Calif.; William P. Gergen, Houston, Tex.

[73] Assignee: Shell Oil Company, Houston, Tex.

[21] Appl. No.: 179,682

[22] Filed: Apr. 11, 1988

[51] Int. Cl.⁴ .............................................. C08L 69/00
[52] U.S. Cl. ................................... 525/468; 525/462; 528/392
[58] Field of Search ................. 525/468, 462; 528/392

[56]  References Cited

U.S. PATENT DOCUMENTS

| | | | |
|---|---|---|---|
| 2,495,286 | 1/1950 | Brubaker | 260/63 |
| 3,694,412 | 9/1972 | Nozaki | 260/63 |
| 3,780,140 | 12/1973 | Hammer | 260/884 |
| 4,111,895 | 9/1978 | Gergen et al. | 260/42.18 |
| 4,137,382 | 1/1979 | Vetter | 525/468 |
| 4,600,614 | 7/1986 | Lancaster et al. | 428/35 |
| 4,601,948 | 7/1986 | Lancaster et al. | 428/349 |

FOREIGN PATENT DOCUMENTS

| | | |
|---|---|---|
| 121965 | 10/1984 | European Pat. Off. . |
| 181014 | 5/1986 | European Pat. Off. . |
| 222454 | 5/1987 | European Pat. Off. . |
| 1081304 | 3/1965 | United Kingdom . |

OTHER PUBLICATIONS

Webster's New World Dictionary of the American Language, 1972, pp. 150, 1552.

Primary Examiner—Harold D. Anderson
Attorney, Agent, or Firm—Dean F. Vance

[57] ABSTRACT

The invention is a polymeric composition comprising a blend of a linear alternating polymer of carbon monoxide and at least one ethylenically unsaturated hydrocarbon with a polycarbonate.

16 Claims, No Drawings ns
4,880,908

POLYMER BLEND OF CARBON MONOXIDE/OLEFIN COPOLYMER AND POLYCARBONATE

FIELD OF THE INVENTION

This invention relates to linear alternating polymers of carbon monoxide and at least one ethylenically unsaturated hydrocarbon and to blend compositions of the polymers. More particularly, this invention relates to blend compositions of linear alternating polymers of carbon monoxide and at least one ethylenically unsaturated hydrocarbon with polycarbonate polymer.

BACKGROUND OF THE INVENTION

Polymers of carbon monoxide and ethylenically unsaturated hydrocarbons, commonly called polyketones, have been known and available in limited quantities for many years. For example, polymers of ethylene or ethylene-propylene which contain small quantities of carbon monoxide are disclosed in U.S. Pat. No. 2,495,286, prepared using free radical catalysts. British Patent No. 1,081,304 discloses polymers containing higher concentrations of carbon monoxide prepared using alkylphosphine complexes of palladium salts as catalysts. A special class of linear polyketones is disclosed in U.S. Pat. No. 3,694,412, wherein the monomer units of carbon monoxide and ethylenically unsaturated hydrocarbons occur in alternating order.

High molecular weight linear alternating polyketones are of considerable interest because they exhibit good physical properties. These polymers can be represented by units of the repeating formula

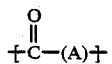

wherein A is the moiety obtained by the polymerization of an ethylenically unsaturated hydrocarbon through the ethylenic unsaturation. A general process for preparing such linear alternating polymers is disclosed, for example, in published European Patent Applications Nos. 121,965 and 181,014. The process comprises contacting the monomers in the presence of a catalyst obtained from a compound of palladium, cobalt or nickel, the anion of a non-hydrohalogenic acid having a pKa less than about 2, and a bidentate ligand of phosphorus, arsenic or antimony. The resulting linear alternating polymers are generally high molecular weight engineering thermoplastics that possess a balance of properties comprising strength, stiffness, impact resistance, and dimensional stability. Such thermoplastics are useful as structural materials and in the production of articles for food and drink containers. Engineering thermoplastics are especially attractive as replacements for metals because of the reduction in weight that can often be achieved as, for example, in automotive applications.

For a particular application, a single thermoplastic, such as high molecular weight linear alternating polyketone, may not offer a particular combination of desired properties. One particularly appealing method of obtaining such advantages is through blending together two or more thermoplastic polymers to give a material with a different combination of properties. Although polyketones have many desirable properties it would be advantageous to have polymeric compositions exhibiting modified properties.

SUMMARY OF THE INVENTION

The invention relates to a polymeric composition comprising a blend of a linear alternating polyketone with other polymeric materials. In particular, the invention is a polymeric composition comprising a blend of a linear alternating polymer of carbon monoxide and at least one ethylenically unsaturated hydrocarbon with a polycarbonate.

DESCRIPTION OF THE INVENTION

The polyketone polymers which are incorporated in the blends of the invention are those linear alternating polyketones produced from carbon monoxide and at least one ethylenically unsaturated hydrocarbon. Suitable ethylenically unsaturated hydrocarbons for production of polyketones through polymerization with carbon monoxide are hydrocarbons of from 2 to 20 carbon atoms inclusive, preferably of up to 10 carbon atoms inclusive, and are aliphatic including ethylene and other alpha-olefins such as propylene, butene-1, isobutylene, octene-1 and dodecene-1, or are arylaliphatic containing an aryl substituent on an otherwise aliphatic molecule, particularly an alpha-olefin containing an aryl substituent on a carbon atom of the ethylenic unsaturation. Illustrative of this latter class are styrene, p-methylstyrene, m-ethylstyrene and p-propylstyrene. Preferred polyketone polymers for use in the compositions of the invention are copolymers of carbon monoxide and ethylene or terpolymers of carbon monoxide, ethylene and a second alpha-olefin of 3 or more carbon atoms, particularly propylene.

Of particular interest are the polyketones of molecular weight from about 1000 to about 200,000 especially those polymers of molecular weight from about 10,000 to about 50,000 and containing substantially equimolar quantities of carbon monoxide and ethylenically unsaturated hydrocarbon.

A method of producing polyketone polymers which is now becoming conventional is to contact the carbon monoxide and the ethylenically unsaturated hydrocarbon(s) under polymerization conditions in the presence of a catalyst formed from a metal compound of palladium, cobalt or nickel, an anion of a non-hydrohalogenic acid having a pKa less than about 6, preferably less than about 2, and certain bidentate ligands of nitrogen or of phosphorus, arsenic or antimony. Although the scope of the polymerization process is extensive, for purposes of illustration of a preferred method of producing the polyketone polymer, the metal compound is palladium acetate, the anion is the anion of trifluoroacetic acid or para-toluenesulfonic acid and the bidentate ligand is selected from 1,3-bis(diphenylphosphino)propane and 1,3-bis[di(2-methoxyphenyl)phosphino]propane.

Polymerization is typically carried out at elevated temperature and pressure in the gaseous phase in the substantial absence of reaction diluent or in the liquid phase in the presence of a reaction diluent such as a lower alkanol, e.g., methanol or ethanol. Suitable reaction temperatures are from about 20° C. to about 150° C. with preferred temperatures being from about 50° C. to about 125° C. The reaction pressure will typically be from about 1 bar to about 200 bar, preferably from about 10 bar to about 100 bar. The reactants and catalyst are contacted by conventional methods such as shaking or stirring and subsequent to reaction the polymer product is recovered as by filtration or decantation. The polymer product will, on occasion, contain metal or other residues of the catalyst which are removed, if desired, by treatment of the polymer product with a complexing agent or solvent which is selective for the residues. Production of this class of polymers is illustrated, for example, by copending U.S. patent application Ser. No. 930,468, filed Nov. 14, 1986 (Docket No. K-0722).

The physical properties of the polymer and the compositions of the invention will be in part determined by the molecular weight of the polymer, whether the polymer is a copolymer or terpolymer and which unsaturated hydrocarbons have been employed in its production. Suitable linear alternating polyketones for use in the invention have limiting viscosity numbers (LVN) as measured in m-cresol at 60° C., using a standard capillary viscosity measuring device, in the range of about 0.5 to about 10 LVN, more preferably from about 0.8 to about 4 LVN and most preferably from about 1.1 to about 2.5. Typical melting points of the polyketone polymers are from about 175° C. to about 300° C., more frequently from about 210° C. to about 260° C. The structure of the polymer in the preferred modifications is that of a linear alternating polymer of units of carbon monoxide and ethylene and carbon monoxide and any second ethylenically unsaturated hydrocarbon if present. The preferred polyketone polymers contain substantially one carbon monoxide moiety for each moiety of unsaturated hydrocarbon. When terpolymers are produced from carbon monoxide, ethylene and a second ethylenically unsaturated hydrocarbon, i.e., an alpha-olefin of at least 3 carbon atoms such as propylene, there will be at least about 2 units incorporating a moiety of ethylene per unit incorporating a moiety of the second ethylenically unsaturated hydrocarbon. Preferably, there are from about 10 to about 100 units incorporating a moiety of ethylene per unit incorporating a moiety of the second ethylenically unsaturated hydrocarbon. The preferred class of polyketone polymers is therefore characterized by a polymer chain of the formula

    I wherein G is the moiety obtained by the polymerization of the second ethylenically unsaturated hydrocarbon of at least 3 carbon atoms through the ethylenic unsaturation. By way of further illustration, when the second ethylenically unsaturated hydrocarbon is propylene, the G moiety will be

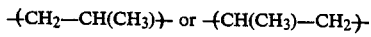

depending upon the stereochemistry of the polymerization. The polyketone terpolymers of the invention may contain both types of G moiety randomly occurring along the polymer chain. The

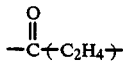

units and the

units will also occur randomly throughout the polymer chain although the ratio of y:x in the above formula I will be no more than about 0.5. In the modification of the invention which employs copolymers of carbon monoxide and ethylene without the presence of a second ethylenically unsaturated hydrocarbon, the polymers are represented by the above formula I wherein y=0. When y is other than 0, i.e. terpolymers are employed, ratios of y:x from about 0.01 to about 0.1 are preferred.

The linear alternating polyketones described by the above formula I will have end groups or "caps" which depend upon the particular components present during polymerization and whether and how the polymer is processed during any subsequent purification. The precise nature of such end groups or "caps" is not critical with regard to overall properties of the polymer, however, and the polymeric polyketones are fairly depicted through use of the polymer chain as depicted above.

The polycarbonates employed in the blends of the invention are polyesters of carbonic acid having a structure illustratively formed by an ester exchange between a dihydroxy compound and a carbonate diester. The method by which the polycarbonates are produced is not material and polycarbonates produced by a variety of methods are useful in the blends of the invention. It is conventional to prepare polycarbonates either by reacting a carbonate precursor, such as phosgene, and a dihydroxy compound, such as bisphenol A (4,4'-dihydroxydiphenyl-2,2-propane), or by ester exchange between a dihydroxy compound and a carbonate diester, such as a diphenyl carbonate. There is a variety of preparative procedures set forth in Chemistry and Physics of Polycarbonates by Herman Schnell, Interscience Division of John Wiley & Co., N.Y. (1964), first edition, as well as in British Patent No. 772,627 and U.S. Pat. Nos. 3,028,365, 4,258,174 and 4,291,151. In general, a preferred reaction is carried out by dissolving the dihydroxy compound in a base such as pyridine and bubbling phosgene into the stirred solution at the desired rate. Trialkylamines may be used to catalyze the reaction as well as to act as acid acceptors throughout the reaction. Since the reaction is normally exothermic, the rate of phosgene addition can be used to control the reaction temperature. The reactions generally utilize equimolar amounts of phosgene and dihydroxy reactants, however, the molar ratios can be varied dependent upon the reaction conditions.

The dihydroxy compounds used to prepare polycarbonates useful in the invention include aliphatic dihydroxy compounds such as alkylene and alkylidene dihydroxy compounds and arylene dihydroxy compounds, such as dihydric phenols. The dihydric phenols employed in preparing suitable polycarbonates are known dihydric phenols in which the sole reactive groups are the two phenolic hydroxyl groups. Some of these are represented by the general formula

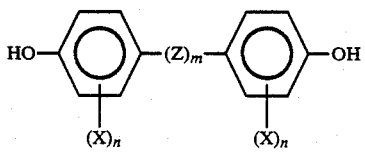

wherein Z is a divalent hydrocarbon radical containing 1-15 carbon atoms such as alkylidene, cycloalkylidene, alkylene or cycloalkylene; or a bridging group such as azo, imino,

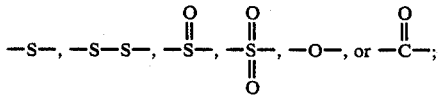

m is an integer of 0 or 1; X independently is halo, nitro, or monovalent hydrocarbon radical such as alkyl group of 1-4 carbon atoms, an aryl group of 6-10 carbon atoms such as phenyl, tolyl, xylyl, naphthyl, an alkoxy group of 1-4 carbon atoms or an aryloxy group of 6-10 carbon atoms and n independently is an integer from 0 to 4 inclusive.

Typical of some of the dihydric phenols that can be employed are bisphenols such as bis(4-hydroxyphenyl)methane, 2,2-bis(4-hydroxyphenyl)propane, 2,2-bis(4-hydroxy-3-methylphenyl)propane, 4,4-bis(4-hydroxyphenyl)heptane, 2,2-bis(4-hydroxy-3,5-dichlorophenyl)propane, 2,2-bis(4-hydroxy-3,5-dibromophenyl)propane, 2,2-bis(4-hydroxy-2,3,5,6-tetrachlorophenyl)propane and 2,2-bis(4-hydroxy-2,3,5,6-tetramethylphenyl)propane; dihydric phenol ethers such as bis(4-hydroxyphenyl)ether and bis(3,5-dichloro-4-hydroxyphenyl)ether; dihydroxydiphenyls such as p,p'-dihydroxydiphenyl and 3,3'-dichloro-4,4'-dihydroxydiphenyl; dihydroxy aryl sulfones such as bis(4-hydroxyphenyl)sulfone and bis(3,5-dimethyl-4-hydroxyphenyl)sulfone; dihydroxy benzenes; halo- and alkyl-substituted dihydroxy benzenes such as 1,4-dihydroxy-2,5-dichlorobenzene and 1,4-dihydroxy-3-methylbenzene; and dihydroxy diphenyl sulfides and sulfoxides such as bis(4-hydroxyphenyl)sulfide, bis(4-hydroxyphenyl)sulfoxide and bis(3,5-dibromo-4-hydroxyphenyl)sulfoxide. Preferred are the dihydric phenols wherein X is the above formula is halo, preferably middle halo, chloro or bromo, or lower alkyl, preferably methyl, and each n is 2 or 4. More preferred are dihydric phenols in which each n in the above formula is 0.

A variety of additional dihydroxy compounds are described in the Schnell reference cited above, which presents a long list of monomers that may be used in polycarbonate synthesis and which are incorporated here by reference. U.S. Pat. Nos. 4,291,151 and 4,258,174 also disclose a long list of dihydric phenols which may be used in polycarbonate synthesis. These disclosures are also incorporated herein by reference.

The carbonate precursor which is reacted with a dihydroxy compound to prepare a polycarbonate may be either a carbonyl halide or a bis(haloformate). The carbonyl halides include carbonyl bromide, carbonyl chloride, and mixtures thereof. The bis(haloformates) suitable for use include the bis(haloformates) of dihydric phenols such as bis(chloroformates) of 2,2-bis(4-hydroxyphenyl)propane, 2,2-bis(4-hydroxy-3,5-dichlorophenyl)propane, hydroquinone, and the like, or bis(haloformates) of glycols such as bis(haloformates) of ethylene glycol, and the like. While all of the above carbonate precursors are useful, carbonyl chloride, also known as phosgene, is preferred.

The preferred polycarbonates used in the blends of the invention are linear aromatic polycarbonates of the general formula

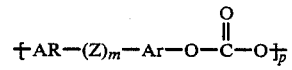

and

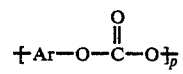

wherein Ar is selected from the group consisting of phenylene and alkyl, aryl, alkoxy, aryloxy, halogen and nitro-substituted phenylene; Z and m have the meanings given before, and p is an integer of at least 2. The exact value of p is not critical but for commercial applications p is typically chosen to give a molecular weight of no more than about 60,000.

The preferred linear aromatic polycarbonate for use in this invention is obtained when Ar in formula IV is p-phenylene and Z is isopropylidene. This aromatic polycarbonate is prepared by reacting bisphenol A with phosgene and is sold by General Electric Company under the trademark LEXAN ® and by Mobay under the trademark MERLON ®. Commercial polycarbonate typically has a molecular weight of at least 18,000 and a melt processing temperature of at least 235° C.

The relative proportions of the two polymer components of the blend can be varied over a wide range. The precise percentage of the polycarbonate to be employed is not critical and percentages from about 1% by weight to about 80% by weight of the polycarbonate, based on the total blend, are satisfactory. Preferably the blends of the invention are predominantly the polyketone with a lesser quantity of the polycarbonate. The use of from about 2% by weight to about 40% by weight of the polycarbonate, based on the total blend, is preferred, from about 5% by weight to about 25% by weight more preferred.

The method of producing the blend of polyketone and polycarbonate is not material so long as an intimate blend of the two components is produced without undue degradation of the blend or its components. A particularly useful procedure is to intimately mix the polymers in the form of granules and/or powder in a high shear mixer. "Intimately mixing" means to mix the polymers with sufficient mechanical shear and thermal energy to ensure that the components will not delaminate on processing. Intimate mixing is typically achieved by employing high shear extrusion compounding machines such as twin screw compounding extruders and thermoplastic extruders.

In blends according to the invention containing levels of polycarbonate below about 50% by volume, the polycarbonate exists as a discrete phase in the polyketone matrix. In blends containing levels of polycarbonate greater than about 50% by volume, the polyketone exists as a discrete phase in the polycarbonate matrix. In certain cases, however, partial miscibility of the polyketone in the polycarbonate phase of the blend may occur, which can be conceptually envisaged as a diffuse interface at the phase boundary of the two components. This near compatibility of the polyketone/polycarbonate phases is evidence of good interfacial adhesion in the blend.

The polyketone polymer/polycarbonate blends of the invention have properties different from those of the polyketone polymer alone or those of the polycarbonate polymer alone. For example, dynamic viscosity measurements of polyketone polymer alone show a distinct increase in melt viscosity with time at elevated temperatures. Addition of polycarbonate to a polyketone matrix increases the rate of viscosity rise for blends containing levels of polycarbonate below about 50% by volume. However, similar viscosity measurements of blends containing levels of polycarbonate greater than 50% by volume, i.e., polycarbonate as the continuous phase, show no increase in melt viscosity with time.

The blends of the invention may also include conventional additives such as antioxidants and stabilizers, fillers and fire retardant materials, mold release agents and other materials designed to increase the processability of the polymer or improve the properties of the resulting blend. Such additives are added by conventional methods prior to, together with or subsequent to the blending of the polyketone and the polycarbonate.

The polymer blends according to the invention can be processed by means of the usual techniques into, among other things, films, sheets, plates, fibers and molded objects. The blends have use and utility as thermoplastics for fibers, films, injection molding, compression molding, or extrusion or blow molding applications. The blends are suitable as artifacts in many application areas, such as in the auto industry, for the manufacture of cables, for containers for the food and beverage industry and for a variety of applications in the domestic sphere.

To illustrate the instant invention, the following illustrative embodiments are given. It is to be understood, however, that the embodiments are given for the purpose of illustration only and the invention is not to be regarded as limited to any of the specific materials or conditions used in the specific embodiments.

Illustrative Embodiment I

A first terpolymer of carbon monoxide, ethylene and propylene was produced in the presence of a catalyst composition formed from palladium acetate, the anion of trifluoroacetic acid and 1,3-bis(diphenylphosphino)-propane. The melting point of the linear terpolymer was 225° C. and it had a limiting viscosity number (LVN) of 1.7 measured at 60° in m-cresol. A second linear alternating terpolymer of carbon monoxide, ethylene and propylene was prepared in the same manner having a melting point of 220° C. and an LVN of 1.29 at 60° C. in m-cresol.

Illustrative Embodiment II

A blend of the first terpolymer of Illustrative Embodiment I and 10% by volume of Merlon-M40 ® polycarbonate, based on total blend, was prepared in a 15 mm twin screw Baker Perkins extruder with a residence time of 0.5 minutes at a temperature of 280° C. Merlon-M40 polycarbonate, commercially available molecular weight of about 40,000, a density of about 1.20 g/cm³, a glass transition temperature of about 145°-150° C. and a melt processing temperature of at least 235° C. The resulting blend had a uniform appearance. The polycarbonate appeared to be a discrete phase in the polyketone matrix with a phase size on the order of about 1-2μ, however, the Tg of the polycarbonate phase was reduced by 65° C., indicating partial miscibility of the polyketone in the polycarbonate phase. The extrudability of the blend was good and the blend was compression molded into a film of about 0.7 mm in thickness.

Illustrative Embodiment III

Blends of MERLON-M40 polycarbonate and the second terpolymer of Illustrative Embodiment I were prepared in a 30 mm twin screw Haake extruder. Room temperature and low temperature (−20° C.) notched izod strengths for these blends were measured using ASTM test method D256 and the results are shown in Table I.

TABLE I

| | | Notched Izod (J/m) | |
|---|---|---|---|
| ᵃPolyketone % v | ᵇPolycarbonate % v | Room Temperature | (−20° C.) |
| 100 | 0 | 94.4 | 48.8 |
| 80 | 20 | 27.8 | 25.9 |
| 60 | 40 | 39.2 | 25.3 |
| 40 | 60 | 160 | 79.8 |
| 20 | 80 | 206 | 70.3 |
| 0 | 100 | 725 | 188 |

ᵃLinear alternating terpolymer of carbon monoxide, ethylene and propylene having a melting point of 220° C. and an LVN of 1.29 at 60° C. in m-cresol.
ᵇMERLON-M40 polycarbonate having an average molecular weight of about 40,000 and a glass transition temperature of about 145-150° C.

Illustrative Embodiment III

The dynamic viscosity of the blends and polymer samples of Illustrative Embodiment II was measured at 275° C. on a parallel plate Rheometrics apparatus at a frequency of radians/sec and a strain of 25%. A rise in melt viscosity with time was observed for the polyketone sample alone, and for the blends containing 20 and 40% by volume of polycarbonate. The 20 and 40% blends showed successive increases in the rate of melt viscosity rise in comparison to the polyketone alone. In the blends tested having more than 50% by volume polycarbonate, the polycarbonate was the continuous phase and no increase in melt viscosity was observed in the Rheometrics measurements.

What is claimed is:

1. A polymeric composition comprising a blend of a linear alternating polymer having recurring units

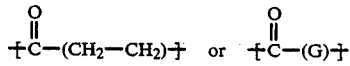

wherein G is the moiety of an ethylenically unsaturated hydrocarbon of at least three carbon atoms and the ratio of units

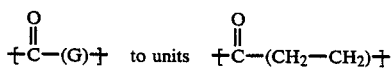

is no more than about 0.5 with a polycarbonate.

2. The composition of claim 1 wherein the ethylenically unsaturated hydrocarbon is propylene.

3. The composition of claim 1 wherein the polycarbonate is present in an amount from about 2% by weight to about 40% by weight, based on total blend.

4. The composition of claim 1 wherein the polycarbonate is selected from a polycarbonate having recurring units

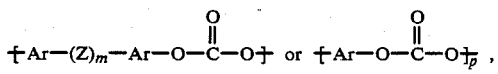 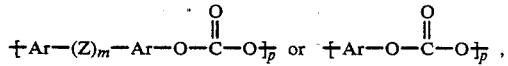

wherein Ar is selected from the group consisting of phenylene and alkyl, aryl, alkoxy, aryloxy, halogen and nitro-substituted phenylene, Z is selected from the group consisting of alkylidene, cycloalkylidene, alkylene, cycloalkene, azo, imino, thio, oxo, —S—S—, sulfoxide and sulfone, m is 0 or 1, and p is at least 2.

5. The composition of claim 4 wherein the polycarbonate has recurring units

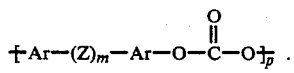

6. The composition of claim 5 where Ar is p-phenylene, Z is isopropylidene and m is 1.

7. A polymeric composition comprising a blend of a linear alternating polymer having recurring units

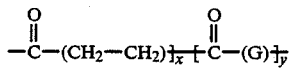

wherein G is the moiety of an ethylenically unsaturated hydrocarbon of at least three carbon atoms and the ratio of y:x is no more than about 0.5 with a quantity from about 2% by weight to about 40% by weight, based on the total blend, of a polycarbonate.

8. The composition of claim 7 wherein the polycarbonate is selected from a polycarbonate having recurring units wherein Ar is selected from the group consisting of phenylene and alkyl, alkoxy, aryloxy, halogen and nitro-substituted phenylene, Z is selected from the group consisting of alkylidene, cycloalkylidene, alkylene, cycloalkene, azo, imino, thio, oxo, —S—S, sulfoxide and sulfone, m is 0 or 1, and p is at least 2.

9. The composition of claim 8 wherein the polycarbonate has recurring units

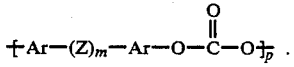

10. The composition of claim 8 wherein the polycarbonate is prepared from 4,4'-dihydroxydiphenyl-2,2'-propane.

11. The composition of claim 10 wherein the polycarbonate has a glass transition temperature of about 145° C.

12. The composition of claim 8 wherein the ethylenically unsaturated hydrocarbon is an alpha-olefin having from 3 to 10 carbon atoms.

13. The composition of claim 12 wherein the alpha-olefin is propylene and the ratio of y:x is from about 0.01 to about 0.1.

14. The composition of claim 8 wherein the polycarbonate is present in an amount from about 5% by weight to about 25% by weight, based on total blend.

15. The composition of claim 9 wherein Ar is p-phenylene, Z is isopropylidene and m is 1.

16. As an article of manufacture, a molded film, comprising the composition of claim 15.

* * * * *